(12) United States Patent
Wada et al.

(10) Patent No.: US 9,135,323 B2
(45) Date of Patent: Sep. 15, 2015

(54) SYSTEM AND METHOD FOR CLASSIFYING DATA DUMP DATA

(75) Inventors: Jon Wada, Santa Monica, CA (US); Mark A. Miller, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 239 days.

(21) Appl. No.: 13/613,121

(22) Filed: Sep. 13, 2012

(65) Prior Publication Data

US 2014/0074840 A1  Mar. 13, 2014

(51) Int. Cl.
| | |
|---|---|
| G06F 7/02 | (2006.01) |
| G06F 17/30 | (2006.01) |
| G06F 11/36 | (2006.01) |
| G06F 11/34 | (2006.01) |
| G06F 9/44 | (2006.01) |
| G06K 9/00 | (2006.01) |
| G06F 9/45 | (2006.01) |

(52) U.S. Cl.
CPC ............ *G06F 17/30598* (2013.01); *G06F 8/52* (2013.01); *G06F 8/70* (2013.01); *G06F 11/3476* (2013.01); *G06F 11/36* (2013.01); *G06F 11/362* (2013.01); *G06F 11/3624* (2013.01); *G06F 11/3636* (2013.01); *G06F 17/30949* (2013.01); *G06K 9/00* (2013.01)

(58) Field of Classification Search
CPC ......... G06F 11/362; G06F 8/70; G06F 11/36; G06F 11/3644; G06F 17/30949
USPC .......................................... 707/747
See application file for complete search history.

(56) References Cited

U.S. PATENT DOCUMENTS

| | | | | |
|---|---|---|---|---|
| 5,815,709 | A * | 9/1998 | Waldo et al. | 712/300 |
| 8,621,282 | B1 * | 12/2013 | Mixter et al. | 714/38.11 |
| 2004/0220975 | A1 * | 11/2004 | Carpentier et al. | 707/200 |
| 2005/0044536 | A1 * | 2/2005 | Kwong et al. | 717/128 |
| 2007/0105607 | A1 | 5/2007 | Russell et al. | |
| 2008/0177756 | A1 | 7/2008 | Kosche et al. | |
| 2012/0102468 | A1 * | 4/2012 | Lefurgy | 717/128 |

FOREIGN PATENT DOCUMENTS

WO   WO-2014042759 A1   3/2014

OTHER PUBLICATIONS

"International Application Serial No. PCT/US2013/050264, International Search Report mailed Oct. 14, 2013", 3 pgs.
"International Application Serial No. PCT/US2013/050264, Written Opinion mailed Oct. 14, 2013", 7 pgs.

* cited by examiner

*Primary Examiner* — Bruce Moser
(74) *Attorney, Agent, or Firm* — Schwegman Lundberg & Woessner, P.A.

(57) ABSTRACT

An example of a system comprises a fingerprint calculator configured to receive data structure information and create a fingerprint as a function of the data structure information, a code generator configured to generate modified machine code, the modified machine code including the fingerprint embedded therein, a fingerprint identifier configured to identify the fingerprint in data received from a data dump, a data structure lookup table including the fingerprint and the data structure information associated with the fingerprint stored thereon, and a data interpreter configured to interpret, using data from the data dump and the data structure information, the data structure of at least a portion of the data from the data dump.

20 Claims, 6 Drawing Sheets

SYSTEM AND METHOD FOR CLASSIFYING DATA DUMP DATA

GOVERNMENT RIGHTS

This invention was made with United States Government support under Contract Number [WITHHELD]. The United States Government has certain rights in this invention.

TECHNICAL FIELD

This disclosure relates generally to classifying data from a data dump.

BACKGROUND ART

Reconstructing data structures from a data dump can be fraught with problems. Data dumps can be received from instruments such as embedded software instruments. Embedded software instruments are common and typically designed to control specific functions within a larger system. These instruments are used in many places such as digital watches, portable music players, traffic lights, or factory controllers. Debugging software of the embedded instrument can be problematic.

DESCRIPTION OF EMBODIMENTS

Figure 1:
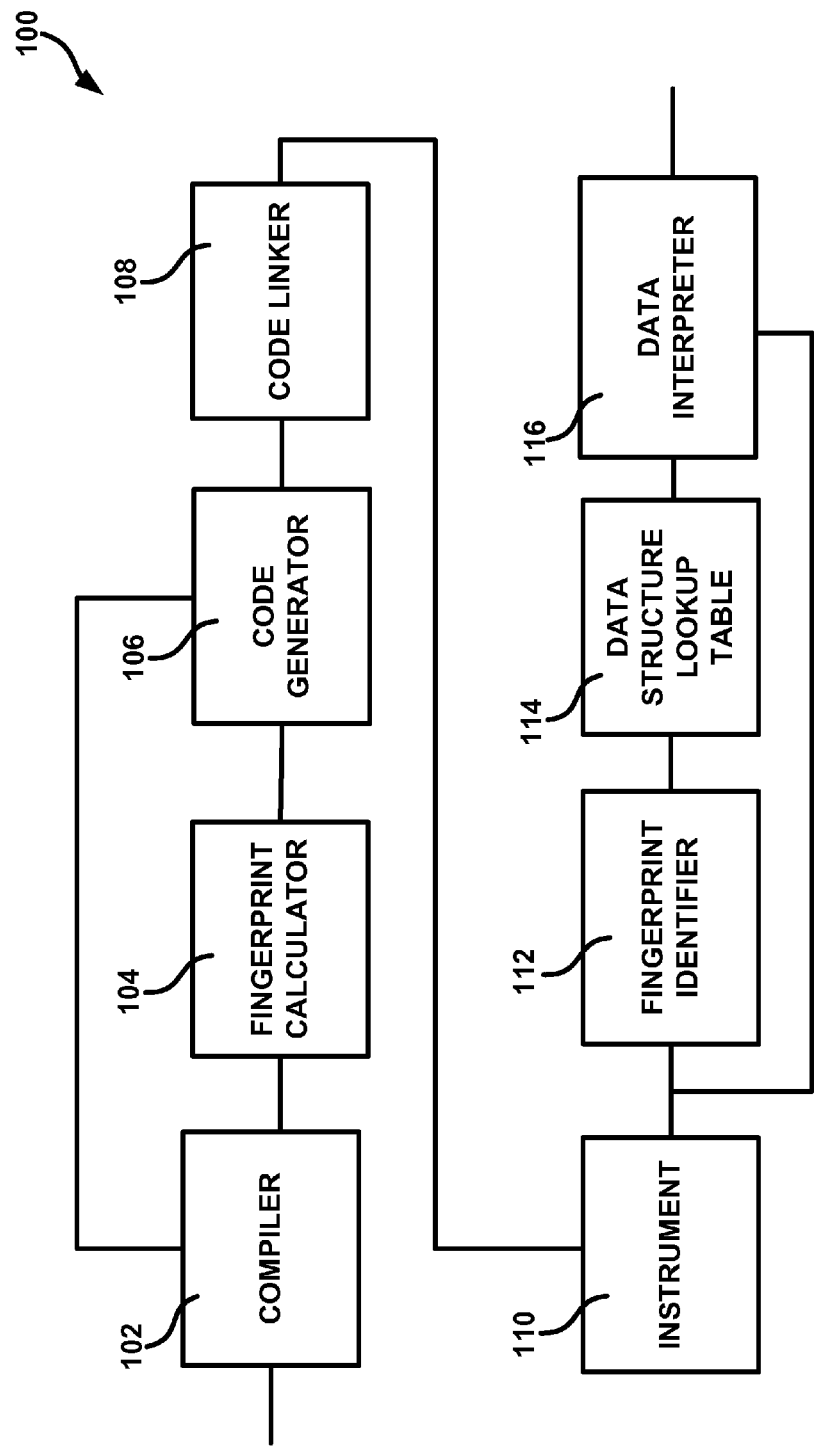
FIG. 1 illustrates a block diagram of an example of an apparatus.

In the following detailed description, reference is made to the accompanying drawings that form a part hereof, and in which is shown by way of illustration specific embodiments in which the inventive subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

Instrumentation is a branch of engineering dealing with measurement and control. Instrumentation of embedded software is a technique for debugging software of embedded instruments. Instrumentation of embedded software can be used to verify proper system operation or locate and diagnose problems with the embedded software. In some instances, instrumentation of embedded software includes obtaining a data dump data, such as binary data, from an embedded instrument (e.g. obtaining a stream of bits from the embedded instrument).

A problem associated with debugging or verifying software or firmware operation using a data dump can include determining the memory layout of the data obtained from the data dump. For example, turning data from a data dump into programming language data structures can be difficult. A data dump may not be self-describing, thus reconstructing the data structure of the data dump data can be difficult (as used herein, "data dump data" includes data provided through a data dump). This problem can be compounded by software or firmware that includes many complex data structures. A possible solution to this problem can be to generate a hash tag for every data structure present in the data dump data and create a lookup table of hash tags and corresponding data structures. The hash tag can be embedded at a corresponding location in the data dump data such that the hash tag can be correctly associated with corresponding data dump data. In this way the data structure associated with the data dump data can be reconstructed by interpreting the data dump data in light of the corresponding description in the lookup table corresponding to the relevant hash tag.

Another problem associated with debugging or verifying embedded instrument operation using data dumps can include instrument bandwidth constraints limiting the amount of descriptive metadata that can be attached to the data dump data. Thus, the bandwidth of the instrument can limit the number of possible metadata descriptors that can be attached to the dump data, making it difficult to describe the data dump data in a system with more data structure types than available descriptors. By creating a relatively small hash tag for each data structure and adding the hash tag to the data stream when a data structure is present in the data dump data a sufficiently small amount of bandwidth can be used such that the bandwidth constraints can still be met.

FIG. 1 shows a block diagram of an example of a system 100 for classifying dump data. The system 100 can include a compiler 102, a fingerprint calculator 104, a code generator 106, a code linker 108, an instrument 110, a fingerprint identifier 112, a data structure lookup table 114, or a data interpreter 116. Any of the numbered items of FIG. 1 can be implemented using one or more modules.

The compiler 102 is operable to receive source code and produce a lower level representation of the source code such as an intermediate level representation of the source code (e.g. a level not as high as source code and not as low as machine or object code). The compiler 102 can receive source code written in a variety of programming languages such as C, Python, Matlab, C++, Visual Basic, Java, C#, Basic, Perl, or Haskell, among others. The compiler 102 can create a header file with a declaration of data structures present in the source code. The compiler c102 an create a text description, such as a memory layout description, of the data structures present in the source code The fingerprint calculator 104 is operable to receive data representative of a data structure (e.g., data structure information) and calculate a fingerprint as a function of the data representative of the data structure. The fingerprint can be a non-cryptographic hash, a cryptographic hash, such as an MD-4, MD-5, SHA-1, or SHA-2 hash, or some other identifier. The fingerprint calculator 104 can be coupled to the compiler 102 to transmit a calculated fingerprint thereto. The fingerprint calculated by the fingerprint calculator 104 can be sufficiently small (e.g., comprise a sufficiently small number of bits such two bytes or fewer bits) such that a fingerprint created does not take up too much bandwidth when transmitted in a data dump. The fingerprint calculator 104 can embed a calculated fingerprint in the intermediate level representation of source code received from the compiler 102. The fingerprint can be embedded in a location in the intermediate level representation such that the fingerprint can be associated with a specific data structure. The fingerprint can directly precede the data structure it represents. It should be appreciated that the fingerprint can be located at any place in the intermediate level representation of the source code so long as the fingerprint can be associated with the data structure it is to represent.

The code generator 106 is operable to transform source code or an intermediate level representation of source code into machine, assembly, or object code. The code generator 106 can receive compiler 102 output such as source code, a memory layout description, or a header file that includes a declaration of data structures. The code generator 106 can receive one or more fingerprints from the fingerprint calculator 104. The code generator 106 can receive an intermediate level representation of source code with at least one fingerprint embedded therein. The code generator 106 can transform the intermediate level representation of source code embedded with at least one fingerprint into machine, assembly, or object code. The transformed intermediate level representation of the source code can include a representation of the fingerprint embedded therein.

The code generator 106 can receive source code or an intermediate level representation of source code from compiler 102 and at least one fingerprint from fingerprint calculator 104. The code generator 106 can be operable to create modified machine code as a function of the source code and the at least one fingerprint. The modified machine code can include machine code created using the source code and the fingerprint embedded therein. The fingerprint can directly precede the data structure it represents in the code generated by code generator 106. It should be appreciated that the fingerprint can be located at any place in the code generated by code generator 106 so long as the fingerprint can be associated with the data structure it is to represent.

The code linker 108 is operable to combine multiple objects, or chunks of machine, assembly, or object code, into an executable program. The code linker 108 can receive the objects or chunks of machine, assembly, or object code from the code generator 106.

The instrument 110 is operable to provide a data dump of data including a fingerprint embedded therein. The data dump data can be binary data received from a data port of the instrument 110. The data dump data can be streamed from the instrument 110. The instrument 110 can include the executable generated by the code linker 108, such as running the executable code as an application. The instrument 110 can be an embedded instrument programmed with the executable code.

The fingerprint identifier 112 is operable to retrieve or identify a fingerprint included in data received from a data dump. The data dump can be received from instrument 110 or any other device capable of providing a data dump to the fingerprint identifier 112. The fingerprint identifier 112 can be configured to find a specific bit string in a data dump and, using pre-defined rules, determine the fingerprint. For example, consider a data dump of bits comprising "101110110001010011," and assume that the pre-defined rule is that an eight bit fingerprint immediately follows the specific bit string "101100." The fingerprint identifier 112 can scan the bit sequence for the first instance of the specific bit string "101100." The first instance of this string in this example begins at the fifth bit of the sequence. Using the pre-defined rule that the eight bit fingerprint immediately follows the specific bit string, the fingerprint identifier 112 determines that the fingerprint is "01010011". A pre-defined rule can be that there is a specific bit string, such as "10100," followed by a two byte fingerprint, followed by a two byte unsigned number indicating the number of bits that describe the corresponding data structure. A pre-defined rule such as this can help eliminate repeatedly searching the data dump data for the specific bit string or avoid errors in the event that the fixed pattern occurs in the data dump data.

The data structure lookup table 114 is operable to store data structure information and a fingerprint corresponding to the data structure represented by the data structure information. Data structure information can include a name of a variable, type of variable, a location of a variable in memory, a size of a variable, a type of encoding used for a variable, a number of bits between members of an array variable, a number of bits in the data dump data corresponding to the data structure of a variable (the number of bits in the data dump data corresponding to the data structure of a variable may or may not include the number of bits of the corresponding fingerprint), or the like. As used herein, a variable can include a corresponding data structure and can comprise one or more variables that can change value, remain constant, or a combination thereof.

Data structure information can be presented in a file or embedded in output compiler code. For example, a compiler 102 can be configured to produce output using a DWARF (Debugging With Attributed Record Formats) file format and can produce a file with a ".o" (Output) extension that includes data structure information contained therein. Such an output can be realized, for example, using a DWARF output from a GNU Compiler Collection (GCC) compiler system. In another example, a Microsoft® compiler generates a file with a ".pdb" (Program Database) extension that includes data structure information. The data structure information can be determined from reading and interpreting a file that includes the data structure information. The compiler 102 can be configured to embed data structure information in executable data. The data structure information can be retrieved from the executable data. Software can interpret the file or executable data to extrapolate the data structure information. The data structure information can be logged in data structure lookup table 114. The data structure information can be recorded as a data structure object. The data structure lookup table 114 can include a list of pre-defined data structures that include data structure information. Data structure information can be recorded in a file such as an XML (Extensible Markup Language) or JSON (JavaScript Object Notation) file. Files containing data structure information can be read by a generic library and the data structure information read from the files can be used to interpret data received from a data dump.

The data interpreter 116 is operable to receive data structure information and data dump data and construct a data structure based on at least some of the data structure information and at least some of the data dump data. The data interpreter 116 can be coupled to instrument 110 to receive data dump data. The data interpreter 116 can be coupled to data structure lookup table 114 to receive data structure information. To expand on a previous example, consider the fingerprint "01010011" and the corresponding data structure bit stream "1011111011101111." By looking up the fingerprint in data structure lookup table 114 it is determined that the data structure is an unsigned sixteen bit integer, named "cattle." The data interpreter 116 knows that the next sixteen bits define the value for "cattle," and determines that the value for "cattle" was 48,879 in decimal (or "BEEF" in hexadecimal) at the point in time corresponding to that portion of the data dump. This example uses binary dump data, however it should be appreciated that the data dump data can be provided in any base such as three, four, five, six, seven, eight, nine, ten . . . sixteen, etc.

Figure 2:
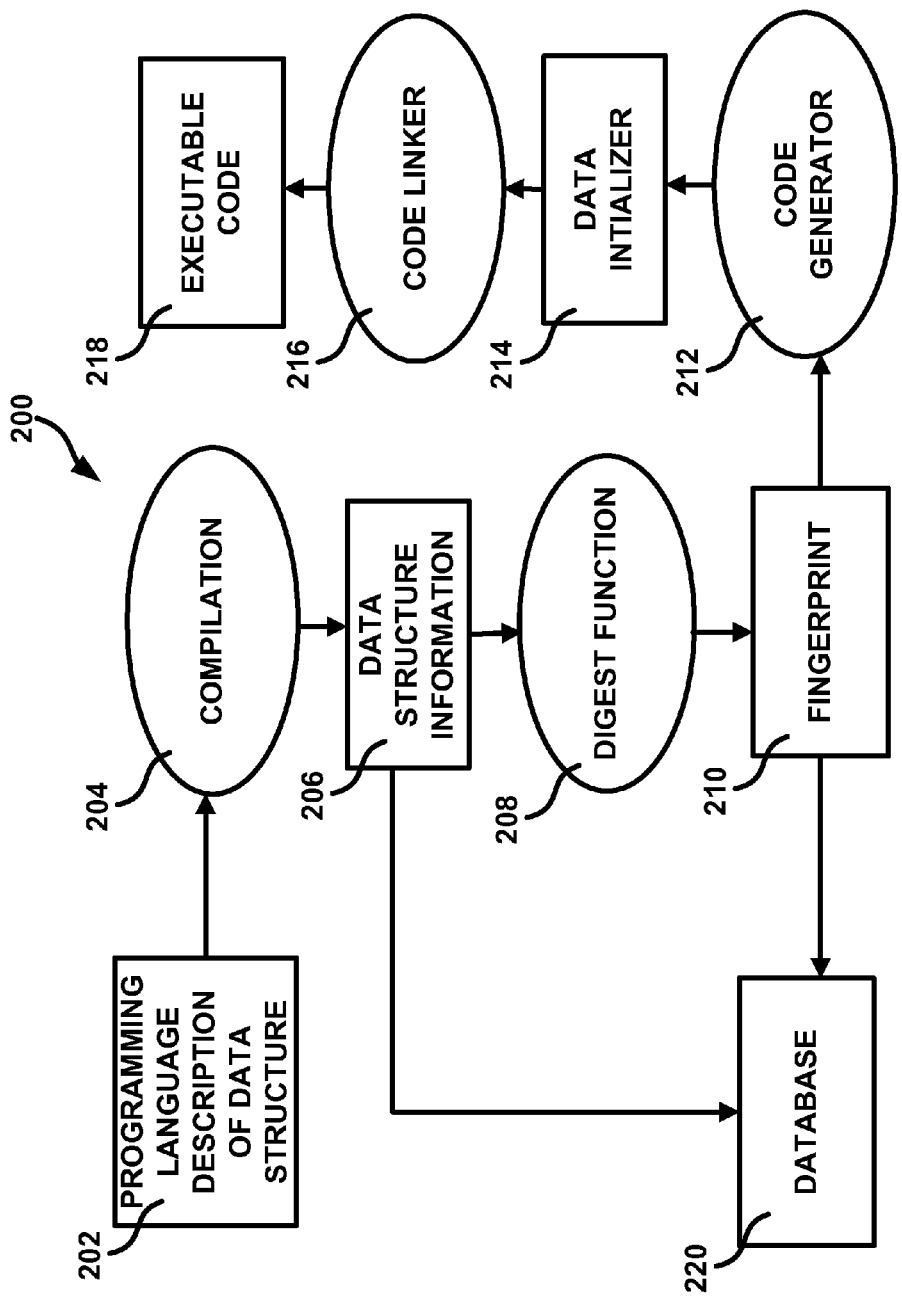
FIG. 2 illustrates an example of a technique of constructing data capable of being classified.

FIG. 2 shows an example of a technique 200 of constructing data capable of being classified, according to an example embodiment. At 202, a programming language definition of a data structure can be received. At 204, the programming language definition can be compiled, such as with compiler 102. At 206, data structure information can be created, such as by the compiler 102. At 208, the data structure information can be processed by a digest function, such as can be implemented by fingerprint calculator 104. At 210, the digest function can create a fingerprint. The fingerprint can be unique to the data structure. At 212, the fingerprint can be sent to a code generator, such as code generator 106. At 214, the variables of the compiled code can be initialized. At 216, the initialized data can be sent to a code linker, such as code linker 108. At 218, the initialized data can be processed into executable code. The executable code can be used as an application on an instrument such as instrument 110.

At 220, the data structure information and fingerprint can be logged in a database, such as data structure lookup table 114. The data structure information can be logged according to the value of the fingerprint such that when a user, processor, or the like, looks up the fingerprint the corresponding data structure can be determined.

Figure 3:
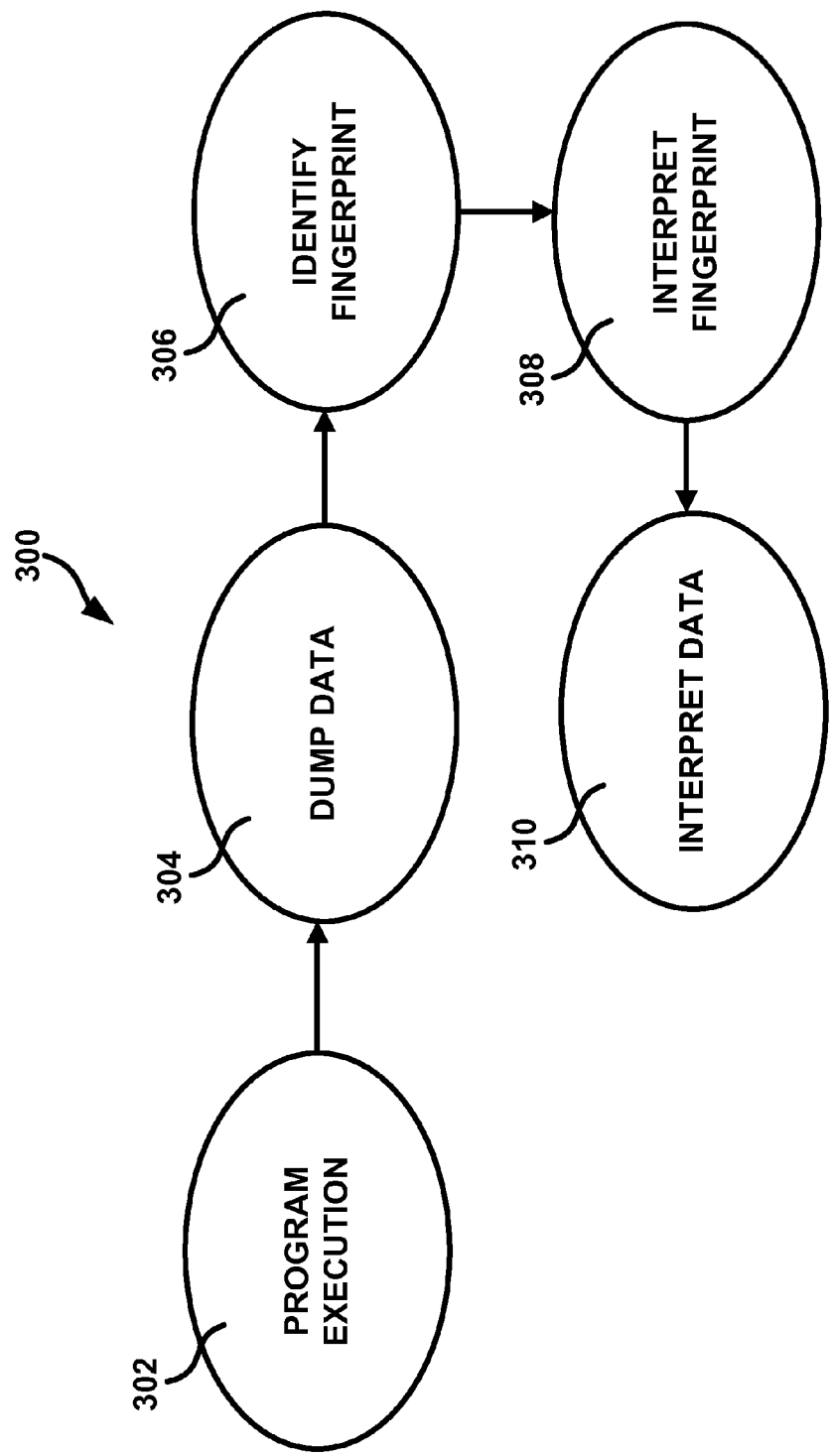
FIG. 3 illustrates an example of a technique of reconstructing a data structure from a data dump.

FIG. 3 shows an example of a technique 300 of reconstructing a data structure from a data dump. Executable code can be created. At 302, the executable code can be executed as a program. At 304, the code executed or modified by the program can be transmitted (e.g. streamed) in a data dump. At 306, a fingerprint embedded in the code can be identified, such as by using fingerprint identifier 112. At 308, the identified fingerprint can be sent to be interpreted, such as by looking up the identified fingerprint in data structure lookup table 114. At 310, the data can be interpreted, such as by using data interpreter 116. The interpreted data can be sent to a machine or module operable to reconstruct what the program was doing at or around the time corresponding to the data dump.

Figure 4:
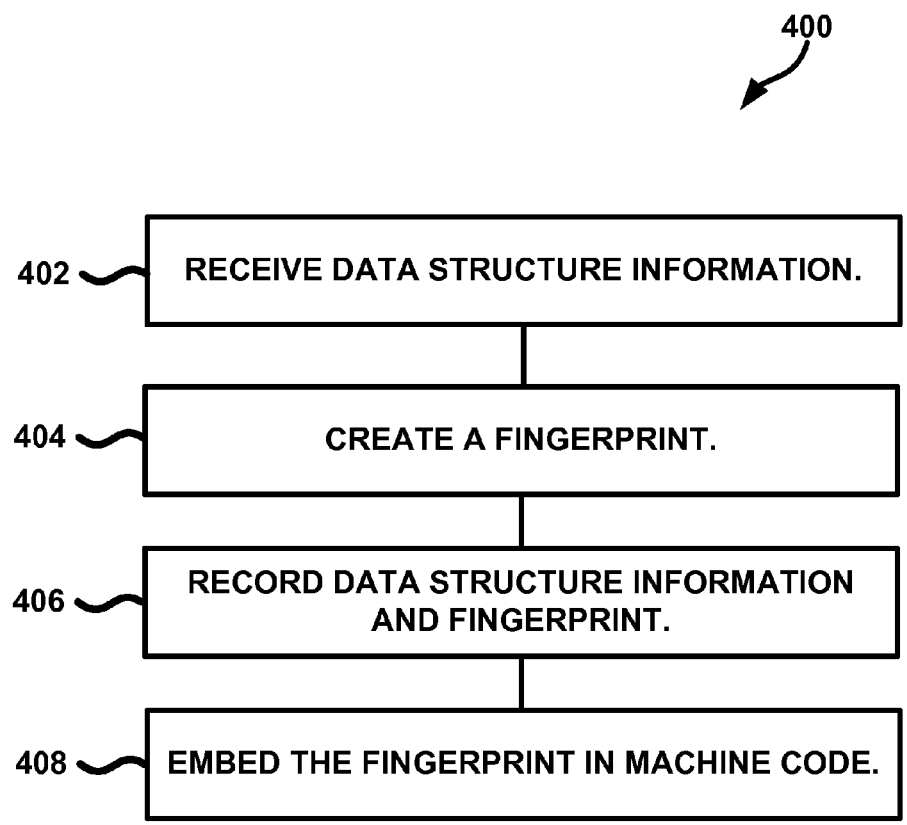
FIG. 4 illustrates an example of a technique of constructing data capable of being classified.

FIG. 4 shows an example of a technique 400 of constructing data capable of being classified, according to an example embodiment. At 402, data structure information can be received. The data structure information can be extrapolated, such as by reading or interpreting an output file created by a compiler 102 or determining the data structure information by reading and interpreting code produced by the compiler 102. Receiving data structure information can include receiving a name of a variable, a variable type, a location of the variable, or the size of the variable. At 404, a fingerprint can be created, such as by using fingerprint calculator 104. At 406, the data structure information and fingerprint can be recorded, such as recording in a data structure lookup table 114 or a database that includes the data structure lookup table 114. The fingerprint can be embedded in machine code using a code generator 106. The fingerprint can be embedded in a known location such that when the fingerprint is read the data corresponding to the data structure corresponding to the fingerprint can be extrapolated.

Figure 5:
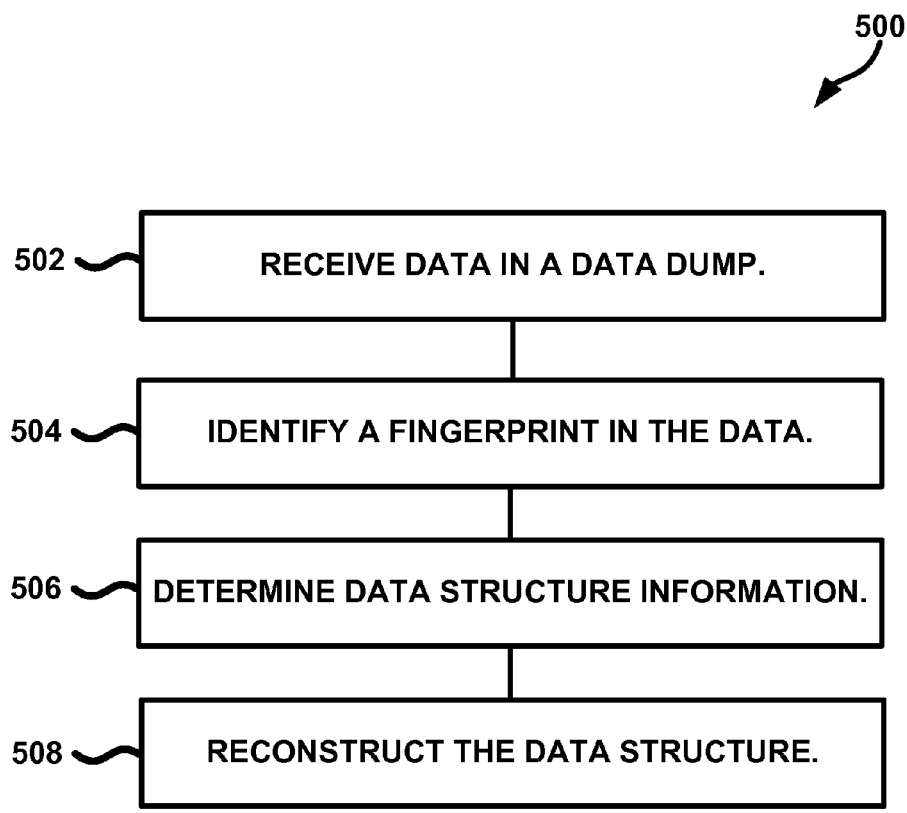
FIG. 5 illustrates an example of a technique of reconstructing a data structure from a data dump.

FIG. 5 is an example of a technique 500 of reconstructing a data structure from a data dump. At 502, data can be received in a data dump, such as by streaming data from instrument 110. A fingerprint identifier 112 can receive the data dump. At 504, a fingerprint in the data dump data can be identified, such as by using fingerprint identifier 112. At 506, data structure information can be determined, such as by looking up the data structure information in a database or data structure lookup table 114. At 508, the data structure can be reconstructed, such as by using data interpreter 116. A new fingerprint can be created after the data structure, or the corresponding data structure information, is modified.

Figure 6:
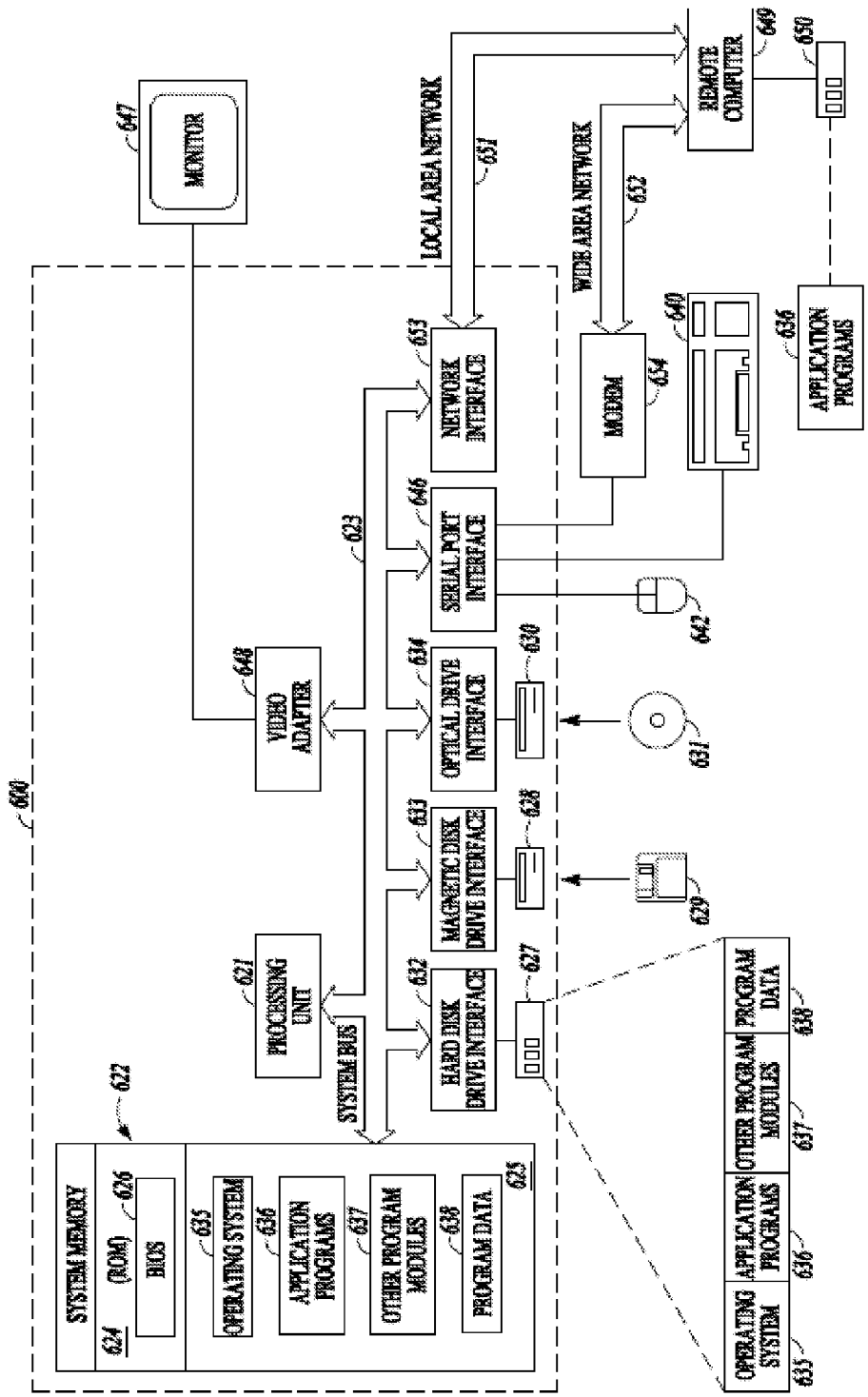
FIG. 6 illustrates an example of a computer system to implement methods.

FIG. 6 is a block diagram of a computer system to implement methods according to an example embodiment. In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There can be only one or there can be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, can be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein can be resident on any one or number of these computer-readable media.

A user can enter commands and information into computer 600 through input devices such as a keyboard 640 and pointing device 642. Other input devices (not shown) can include a microphone, joystick, game pad, satellite dish, scanner, or the like. These other input devices are often connected to the one or more processing units 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 can operate in a networked environment using logical connections to one or more remote computers or servers, such as server 649. These logical connections are achieved by a communication device coupled to or a part of the computer 600; the invention is not limited to a particular type of communications device. The server 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which can be internal or external, is connected to the system bus 623 via the serial port interface 646. In a networked environment, program modules depicted relative to the computer 600 can be stored in the remote memory storage device 650 of remote computer, or server 649 (e.g., remote server or remote computer). It is appreciated that the network connections shown are exemplary and other means of, and communications devices for, establishing a communications link between the computers can be used including hybrid fiber-coax connections, T1-T3 lines, DSL's, OC-3 and/or OC-12, TCP/IP, microwave, wireless application policy, and any other electronic media through any suitable switches, routers, outlets and power lines, as the same are known and understood by one of ordinary skill in the art.

The flowchart and block diagrams in the Figures illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An advantage of one or more embodiments can include adding a minimal amount of metadata to the data dump. A hash tag value created based on the data structures present in the embedded instrument can be concise and unique to allow a minimal amount of bits to be added to the dump data while still identifying what the data structure is. Another advantage of one or more embodiments can include automatically changing the hash tag as a data structure is modified. Another advantage of one or more embodiments can include removing an element of human error in binary data dump systems that include a manual assignment of data type identifiers. Another advantage of one or more embodiments can include eliminating coordination of assigned identifiers. This advantage can be particularly relevant with embedded instruments that include some form of distributed development.

Another advantage of one or more embodiments can include shifting complexity from the back end to the front end. That is, complexity can be shifted from figuring out the data structure on the back end to adding a description of the data structure using a building tool (e.g. compiler). Another advantage of one or more embodiments can include eliminating build or version identifiers. This advantage can be particularly relevant with embedded instruments that include some form of distributed or incremental build. Another advantage of one or more embodiments can include not generating a new fingerprint for a data structure if the data structure has not changed.

EXAMPLES AND ADDITIONAL NOTES

In Example 1, a system for classifying data dump data comprises a fingerprint calculator configured to receive data structure information.

In Example 2, the fingerprint calculator of Example 1 is configured to create a fingerprint as a function of the data structure information.

In Example 3, the system of at least one of Examples 1-2 comprises a code generator configured to generate modified machine code, the modified machine code including the fingerprint embedded therein.

In Example 4, the system of at least one of Examples 1-3 comprises a fingerprint identifier configured to identify the fingerprint in data received from a data dump.

In Example 5, the system of at least one of Examples 1-4 comprises a data structure lookup table including (1) the fingerprint and (2) the data structure information stored therein.

In Example 6, the system of at least one of Examples 1-5 comprises a data interpreter configured to interpret the data structure, using at least some of the data from the data dump and the data structure information.

In Example 7, the data structure information of at least one of Examples 1-6 comprises a type of variable, a name of the variable, a size of the variable, or a location of the variable.

In Example 8, the fingerprint calculator of at least one of Examples 1-7 is configured to use a cryptographic hash algorithm to create the fingerprint.

In Example 9, the fingerprint of at least one of Examples 1-8 is created using at least one of an MD4, MD5, SHA-1, or SHA-2 hash algorithm.

In Example 10, the data structure lookup table of at least one of Examples 1-9 is a database.

In Example 11, the data dump of at least one of Examples 1-10 is received from an embedded instrument.

In Example 12 a computer implemented method comprises receiving data structure information.

In Example 13, the method of at least one of Examples 1-12 comprises creating a fingerprint as a function of the data structure information.

In Example 14, the method of at least one of Examples 1-13 comprises recording the data structure information and the fingerprint in a data structure lookup table.

In Example 15, the method of at least one of Examples 1-14 comprises embedding the fingerprint in source code so that data dump data corresponding to a data structure corresponding to the data structure information can be extrapolated.

In Example 16, the method of at least one of Examples 1-15 comprises receiving data, including the fingerprint, in a data dump.

In Example 17, the method of at least one of Examples 1-16 comprises identifying the fingerprint in the data in the data dump.

In Example 18, the method of at least one of Examples 1-17 comprises looking up the data structure information corresponding to the fingerprint in the data structure lookup table.

In Example 19, the method of at least one of Examples 1-18 comprises reconstructing the data structure using the data structure information and at least some of the data in the data dump.

In Example 20, creating the fingerprint of at least one of Examples 1-19 includes creating a cryptographic hash.

In Example 21, determining the data structure corresponding to the fingerprint of at least one of Examples 1-20 includes looking up the corresponding data structure in a lookup table.

In Example 22, receiving data structure information of at least one of Examples 1-21 includes receiving at least one of variable name, variable type, location of the variable, or the size of the variable.

In Example 23, receiving the data dump of at least one of Examples 1-22 includes streaming the dump data from an instrument.

In Example 24, the method of at least one of Examples 1-23 comprises updating the fingerprint of the data structure information after the corresponding data structure is modified.

In Example 25, creating the fingerprint of at least one of Examples 1-24 includes creating the fingerprint using a fingerprint calculator.

In Example 26, embedding the fingerprint of at least one of Examples 1-25 includes embedding the fingerprint using a code generator.

In Example 27, identifying the fingerprint of at least one of Examples 1-26 includes identifying the fingerprint using a fingerprint identifier.

In Example 28, reconstructing the data structure of at least one of Examples 1-27 includes reconstructing the data structure using a data interpreter.

In Example 29, the instrument of at least one of Examples 1-28 is an embedded instrument.

In Example 30 a machine readable storage device stores instructions, which, when performed by a machine, cause the machine to perform operations for classifying data dump data comprising receiving data structure information.

In Example 31, the machine readable storage device of at least one of Examples 1-30 comprises instructions which, when performed by a machine, cause the machine to perform operations comprising creating a fingerprint as a function of the data structure information.

In Example 32, the machine readable storage device of at least one of Examples 1-31 comprises instructions which, when performed by a machine, cause the machine to perform operations comprising recording the data structure information and the fingerprint in a data structure lookup table.

In Example 33, the machine readable storage device of at least one of Examples 1-32 comprises instructions which, when performed by a machine, cause the machine to perform operations comprising embedding the fingerprint in machine code so that data dump data corresponding to a data structure corresponding to the data structure information can be extrapolated.

In Example 34, the machine readable storage device of at least one of Examples 1-33 comprises instructions which, when performed by a machine, cause the machine to perform operations comprising receiving data, including the fingerprint, in a data dump.

In Example 35, the machine readable storage device of at least one of Examples 1-34 comprises instructions which, when performed by a machine, cause the machine to perform operations comprising identifying the fingerprint in the data in the data dump.

In Example 36, the machine readable storage device of at least one of Examples 1-35 comprises instructions which, when performed by a machine, cause the machine to perform operations comprising determining the data structure by looking up the data structure information corresponding to the fingerprint in the data structure lookup table.

In Example 37, the machine readable storage device of at least one of Examples 1-36 comprises instructions which, when performed by a machine, cause the machine to perform operations comprising reconstructing the data structure using the data structure information and the data in the data dump.

In Example 38, the instructions for creating the fingerprint of at least one of Examples 1-37 include instructions which, when performed by a machine, cause the machine to perform operations comprising creating a cryptographic hash.

In Example 39, the instructions for determining the data structure corresponding to the fingerprint of at least one of Examples 1-38 include instructions which, when performed by a machine, cause the machine to perform operations comprising looking up the corresponding data structure in a lookup table.

In Example 40, the instructions for receiving data structure information of at least one of Examples 1-39 include instructions which, when performed by a machine, cause the machine to perform operations comprising receiving at least one of a variable name, variable type, location of the variable, and the size of the variable.

In Example 41, the instructions for receiving the data dump of at least one of Examples 1-40 include instructions which, when performed by a machine, cause the machine to perform operations comprising streaming the dump data from an embedded instrument.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the disclosed subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The functions or algorithms described herein are implemented in hardware, software, or a combination of software and hardware in some embodiments. The software can comprise computer executable instructions stored on computer readable media such as memory or other type of storage devices. Further, described functions can correspond to modules, which can be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, process flows can be applicable to software, firmware, and hardware implementations.

Systems and methods of the present disclosure can be implemented on a mobile device as a mobile application, web-based application, on a desktop computer as a computer application, or a combination thereof. A mobile application can operate on a Smartphone, tablet computer, portable digital assistant (PDA), ruggedized mobile computer, or other mobile device. The mobile device can be connected to the Internet or network via Wi-Fi, Wide Area Network (WAN), cellular connection, WiMax, Serial Front Panel Data Port (Serial FPDP), Rapid I/O (Input/Output) Transport, or any other type of wired or wireless method of networking connection. In some embodiments, a web-based application can be delivered as a software-as-a-service (SaaS) package (e.g. cloud-based embodiments) accessible via a device app, a web browser application, or other suitable application, depending on the particular embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computer-implemented system for classifying data dump data comprising:
    one or more processors configured to implement a fingerprint calculator, the fingerprint calculator configured to receive data structure information that details a programming language data structure of a primitive variable of a program to be debugged, and the fingerprint calculator configured to create, a fingerprint as a function of the data structure information;
    a code generator, the code generator configured to generate, modified machine code, the modified machine code including machine code corresponding to the data dump data with the fingerprint embedded therein;
    an embedded instrument to execute the modified machine code, wherein the modified machine code includes binary data that, when executed by the embedded instrument, makes the embedded instrument perform an operation of the program, the embedded instrument to provide the data dump data, the data dump data including machine code from the embedded instrument after running the program and including the fingerprint embedded therein;
    a fingerprint identifier, the fingerprint identifier configured to identify the fingerprint in the data dump data from the embedded instrument;
    a data structure lookup table, the data structure lookup table including (1) the fingerprint and (2) the data structure information associated with the fingerprint stored therein; and
    a data interpreter, the data interpreter configured to interpret, using at least some of the data from the modified machine code and the data structure information, a value of the variable at a point in time corresponding a time the at least some of the data dump data was created.

2. The system of claim 1, wherein the fingerprint calculator is configured to use a cryptographic hash algorithm to create the fingerprint.

3. The system of claim 2, wherein the fingerprint is an MD4, MD5, SHA-1, or SHA-2 hash.

4. The system of claim 1, wherein the data structure information comprises a type and size of a variable.

5. The system of claim 1, wherein the data structure information comprises a name of a variable, type of the variable, a location of the variable, or a size of the variable.

6. The system of claim 1, wherein the data structure lookup table is a database, the database including the data structure lookup table.

7. The system of claim 1, wherein the data dump is received from an embedded instrument.

8. A method of classifying data dump data, comprising:
    receiving data structure information that details a programming language data structure of a primitive variable of a program to be debugged;

creating, using a fingerprint calculator, a fingerprint as a function of the data structure information;
recording the data structure information and the fingerprint in a data structure lookup table;
embedding, using a code generator, the fingerprint in machine code of the program to create modified machine code;
executing, at an embedded instrument, the modified machine code, wherein the modified machine code includes binary data that, when executed by the embedded instrument, makes the embedded instrument perform an operation of the program;
providing, by the embedded instrument, the data dump data, the data dump data including machine code from the embedded instrument after running the program, the data dump data including the fingerprint embedded therein;
identifying the fingerprint in the data dump data; and
reconstructing the data structure using at least some of the data structure information and at least some of the data dump data to determine a value of the primitive variable at a point in time corresponding a time the at least some of the data dump data was created.

9. The method of claim 8, comprising:
looking up the data structure information corresponding to the fingerprint in the data structure lookup table.

10. The method of claim 8, wherein creating the fingerprint includes creating a cryptographic hash.

11. The method of claim 9, wherein reconstructing the data structure includes looking up the data structure in a database including the data structure lookup table.

12. The method of claim 8, wherein receiving data structure information includes receiving a variable name, variable type, location of the variable, and the size of the variable.

13. The method of claim 9, wherein receiving data in the data dump includes streaming data dump data from an embedded instrument.

14. The method of claim 8, comprising:
updating the fingerprint corresponding to the data structure information after the corresponding data structure is modified.

15. A non-transitory machine readable storage device that stores instructions, the instructions which, when performed by a machine, cause the machine to perform operations for classifying data dump data, the operations comprising:
receiving data structure information that details a programming language data structure of a primitive variable of a program to be debugged;
creating a fingerprint as a function of the data structure information;
recording the data structure information and the fingerprint in a data structure lookup table;
embedding the fingerprint in machine code of the program to create modified machine code;
executing the modified machine code, wherein the modified machine code includes binary data that, when executed by the embedded instrument, makes the machine perform an operation of the program;
providing the data dump data, the data dump data including machine code from the embedded instrument after running the program, the data dump data including the fingerprint embedded therein;
identifying the fingerprint in the data dump data; and
reconstructing the data structure using at least some of the data structure information and at least some of the data dump data to determine a value of the primitive variable at a point in time corresponding a time the at least some of the data dump data was created.

16. The machine readable storage device of claim 15, wherein the instructions include instructions which, when performed by the machine, cause the machine to perform operations comprising:
determining the data structure by looking up the data structure information corresponding to the fingerprint in the data structure lookup table.

17. The machine readable storage device of claim 15, wherein the instructions for creating the fingerprint include instructions which, when performed by the machine, cause the machine to perform operations comprising creating a cryptographic hash.

18. The machine readable storage device of claim 16, wherein the instructions for reconstructing the data structure include instructions which, when performed by the machine, cause the machine to perform operations comprising looking up the data structure in a database including the data structure lookup table.

19. The machine readable storage device of claim 15, wherein the instructions for receiving data structure information include instructions which, when performed by the machine, cause the machine to perform operations comprising receiving a variable name, variable type, location of the variable, and the size of the variable.

20. The machine readable storage device of claim 16, wherein the instructions for receiving the data dump include instructions which, when performed by the machine, cause the machine to perform operations comprising streaming the data dump data from an embedded instrument.

* * * * *

UNITED STATES PATENT AND TRADEMARK OFFICE
CERTIFICATE OF CORRECTION

PATENT NO. : 9,135,323 B2  
APPLICATION NO. : 13/613121  
DATED : September 15, 2015  
INVENTOR(S) : Wada et al.

Page 1 of 1

It is certified that error appears in the above-identified patent and that said Letters Patent is hereby corrected as shown below:

In the Specification

In column 2, line 53, delete "c102 an" and insert --102 can--, therefor

In column 7, line 19, delete "I/0" and insert --I/O--, therefor

Signed and Sealed this
Fifteenth Day of March, 2016

Michelle K. Lee
*Director of the United States Patent and Trademark Office*